US010144155B2

(12) United States Patent
Kim et al.

(10) Patent No.: US 10,144,155 B2
(45) Date of Patent: Dec. 4, 2018

(54) PRODUCTION METHOD FOR GLASSY CARBON MOLD

(71) Applicant: CHUNG-ANG UNIVERSITY INDUSTRY-ACADEMIC COOPERATION FOUNDATION, Seoul (KR)

(72) Inventors: Seok Min Kim, Seoul (KR); Jong Won Seok, Gyeonggi-do (KR); Tae Hyoung Kim, Seoul (KR); Jong Hyun Ju, Seoul (KR)

(73) Assignee: CHUNG-ANG UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 406 days.

(21) Appl. No.: 14/375,155

(22) PCT Filed: Jan. 30, 2013

(86) PCT No.: PCT/KR2013/000772
§ 371 (c)(1),
(2) Date: Jul. 29, 2014

(87) PCT Pub. No.: WO2013/115570
PCT Pub. Date: Aug. 8, 2013

(65) Prior Publication Data
US 2015/0017479 A1   Jan. 15, 2015

(30) Foreign Application Priority Data

Jan. 30, 2012  (KR) .................. 10-2012-0008858
Jan. 30, 2013  (KR) .................. 10-2013-0010546

(51) Int. Cl.
B29C 33/38     (2006.01)
B29C 43/00     (2006.01)
(Continued)

(52) U.S. Cl.
CPC .......... *B29C 33/3857* (2013.01); *B29C 33/38* (2013.01); *B29C 43/003* (2013.01);
(Continued)

(58) Field of Classification Search
None
See application file for complete search history.

(56) References Cited

U.S. PATENT DOCUMENTS 5,512,131 A * 4/1996 Kumar .................. H01L 21/768
                                                       216/13
6,143,412 A * 11/2000 Schueller ............... B82Y 15/00
                                                       428/213
2010/0040861 A1* 2/2010 Addiego ............ B01D 39/1692
                                                      428/306.6

FOREIGN PATENT DOCUMENTS

JP    2008001077 A    1/2008
JP    2010047454 A    3/2010
(Continued)

OTHER PUBLICATIONS

International Search Report for PCT/KR2013/000772.

*Primary Examiner* — Jeffrey M Wollschlager
*Assistant Examiner* — Armand Melendez
(74) *Attorney, Agent, or Firm* — The PL Law Group, PLLC

(57) ABSTRACT

The present invention relates to a production method for a glassy carbon mold, and, more specifically, relates to a production method for a glassy carbon mold including the steps of: placing a mixture having a thermosetting resin, a curing agent, and a viscosity adjusting solvent between a thermosetting resin substrate and a master pattern formed by a micro-nano process; pressing either the master pattern or the thermosetting resin substrate and applying heat to form a cured thermosetting resin pattern part on the substrate; and
(Continued)

removing the master pattern, and subjecting the substrate and the cured thermosetting resin pattern.

14 Claims, 5 Drawing Sheets

(51) Int. Cl.
    *C03B 11/08*          (2006.01)
    *C04B 35/524*       (2006.01)
    *B29K 101/10*      (2006.01)

(52) U.S. Cl.
    CPC .......... *C03B 11/082* (2013.01); *C03B 11/084* (2013.01); *C04B 35/524* (2013.01); *B29K 2101/10* (2013.01); *B29K 2907/04* (2013.01); *C03B 2215/07* (2013.01); *C03B 2215/412* (2013.01); *Y02P 40/57* (2015.11); *Y10T 428/12993* (2015.01); *Y10T 428/24479* (2015.01)

(56) References Cited

FOREIGN PATENT DOCUMENTS

| | | | |
|---|---|---|---|
| KR | 20070038892 A | 4/2007 | |
| KR | 20090068490 A | 6/2009 | |
| KR | 10-0928184 B1 | 11/2009 | |
| WO | WO 2010111701 A1 * | 9/2010 | .............. B22F 3/006 |

* cited by examiner

30um line pattern

30um dot pattern

Thermal polymerization resin pattern

Glassy carbon mould

PRODUCTION METHOD FOR GLASSY CARBON MOLD

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2013/000772, filed Jan. 30, 2013, which claims priority to Korean Patent Application Nos. 10-2012-0008858, filed Jan. 30, 2012, and 10-2013-0010546, filed Jan. 30, 2013, entire contents of which are incorporated herein by reference.

BACKGROUND

Field

The present invention relates to a method for producing a glassy carbon mold and a method for forming a fine pattern using the same.

Description of the Related Art

In general, production of materials having a variety of micro- and/or nano-patterns is required in fields, such as displays, optical communications, information storage, diagnosis and treatment, drug development and energy, and plastic micro- and/or nano-patterns obtained by a plastic replication process, are predominantly used for low-cost production suitable for the mass-production of such materials. However, it is not easy to utilize plastic products in some applications for various reasons, such as low heat resistance, heat resistance, water resistance and electrochemical properties thereof, and the lack of the type of optical materials. Use of glass or metal micro- and/or nano-patterns is required in applications for which plastic materials are unsuitable.

Among various methods for forming glass or metal micro- and/or nano-patterns, a replication process using a molding press process is known to be the most suitable for mass-production. In this regard, it is considerably important to maintain shape stability, hardness, and corrosion resistance of the mold for a glass molding press used for the glass molding press process at high temperatures (i.e., 300° C. or higher) and high pressures (2.5 to 3.0 MPa), unlike a mold used for polymer replication processes. For this reason, tungsten carbide (WC), aluminum nitride (AlN), titanium nitride (TiN), aluminum oxide ($Al_2O_3$), or the like are used as a mold material.

The mold material is a representative difficult-to-cut material and is generally subjected to mechanical working based on grinding to form a mold having a depressed micro- and/or nano-pattern, and the mechanical working does not ideally enable working to a form with a minimum diameter (i.e., generally 10 μm to 100 μm) or less for a working tip. In addition, working costs exponentially increase with the increase of working load due to the properties of mechanical working, and there is thus a limit in the formation of array-type micro- and/or nano-patterns. The fine pattern processing techniques based on semiconductor etching are also used for processing micro- and/or nano-patterns of difficult-to-cut materials, but have increased processing costs due to a low etching ratio.

Accordingly, the development of novel methods for producing micro- and/or nano-patterns at low cost using materials stable under high temperatures and pressures is required in order to provide low-cost mass-production techniques for glass or metal micro- and/or nano-patterns.

Accordingly, as prior art, Korean Patent Application No. 2010-0128786 discloses a method for producing a micro/nano mold for a glass molding press process, including molding a thermosetting resin having a micro/nano structure based on a replication process and carbonizing the thermosetting resin, in order to form a glass structure having a micro/nano structure using a glassy carbon mold material which is produced by carbonizing a thermosetting resin and is useful as a mold material of a glass molding press process due to properties such as high temperature hardness and corrosion resistance.

The conventional method discloses various process techniques (for example, adjustment of a curing agent concentration or addition of an alcohol additive) for controlling various defects (e.g., foams or cracks) generated during the production of an integrated form of a glassy carbon mold that should be produced with a predetermined thickness or higher for application to the glass molding press process, but these process techniques fail to stably secure the superior surface qualities of micro/nano patterns present on the glassy carbon mold. In an approach to solve this problem, additional magnetorheological fluid grinding is suggested. The magnetorheological fluid grinding may be applied to some micro-patterns, but deformations may be generated during the grinding, and magnetorheological fluid grinding is unsuitable for application to nano-patterns and microstructures having complicated shapes.

SUMMARY

In one embodiment disclosed herein, provided is a method for producing a glassy carbon mold having a fine pattern with few cracks and bending, and superior surface quality.

In another embodiment, provided is a method for producing a glass or metal molded product using the glassy carbon mold having a fine pattern with few cracks and bending, and superior surface quality.

In accordance with an aspect of the present invention, some embodiments may be realized with provision of a method disclosed herein for producing a glassy carbon mold including disposing a mixture containing a thermosetting resin, a curing agent, and a viscosity-controlling solvent between a master pattern formed by a micro/nano process and a thermosetting resin substrate, pressing and heating the master pattern or the thermosetting resin substrate to form a cured thermosetting resin pattern portion on the substrate, and detaching the master pattern then carbonizing the substrate, and the cured thermosetting resin pattern portion present thereon.

In accordance with another aspect of the present invention, provided is a method for forming a fine glass pattern including disposing the glassy carbon mold produced by the method on a glass substrate, thermally treating the glassy carbon mold and the glass substrate at a glass transition temperature or higher of the glass substrate, pressing the thermally treated glassy carbon mold and the thermally treated glass substrate to transfer a pattern of the glassy carbon mold to the glass substrate, cooling the glass substrate having the pattern transferred from the glassy carbon mold, and detaching the glass substrate from the glassy carbon mold, and a glass substrate including the fine pattern formed by the method.

In accordance with another aspect of the present invention, provided is a method for forming a fine metal pattern including disposing the glassy carbon mold produced by the method on a metal substrate, thermally treating the glassy carbon mold and the metal substrate at a decrystallization temperature or higher of the metal, pressing the thermally treated glassy carbon mold and metal substrate to transfer a pattern of the glassy carbon mold to the metal substrate, cooling the metal substrate having the pattern transferred from the glassy carbon mold, and detaching the metal substrate from the glassy carbon mold, and a metal substrate having the fine metal pattern formed by the method.

The glassy carbon mold according to the present invention is produced by separately forming a pattern portion and a substrate portion. The pattern portion is formed as a thin film and thus minimizes the generation of pores during the production process. The substrate portion is produced using the same material as the pattern portion, and enables easy production of a glassy carbon mold having a fine pattern with few cracks and bending, and superior surface quality. The mold enables the production of glass or metal substrates having a fine pattern with superior surface qualities at low cost, using the glassy carbon mold produced by the method.

BRIEF DESCRIPTION OF THE DRAWINGS

The above and other embodiments of the present invention will be more clearly understood from the following detailed description taken in conjunction with the accompanying drawings, in which.

DETAILED DESCRIPTION

Figure 1:
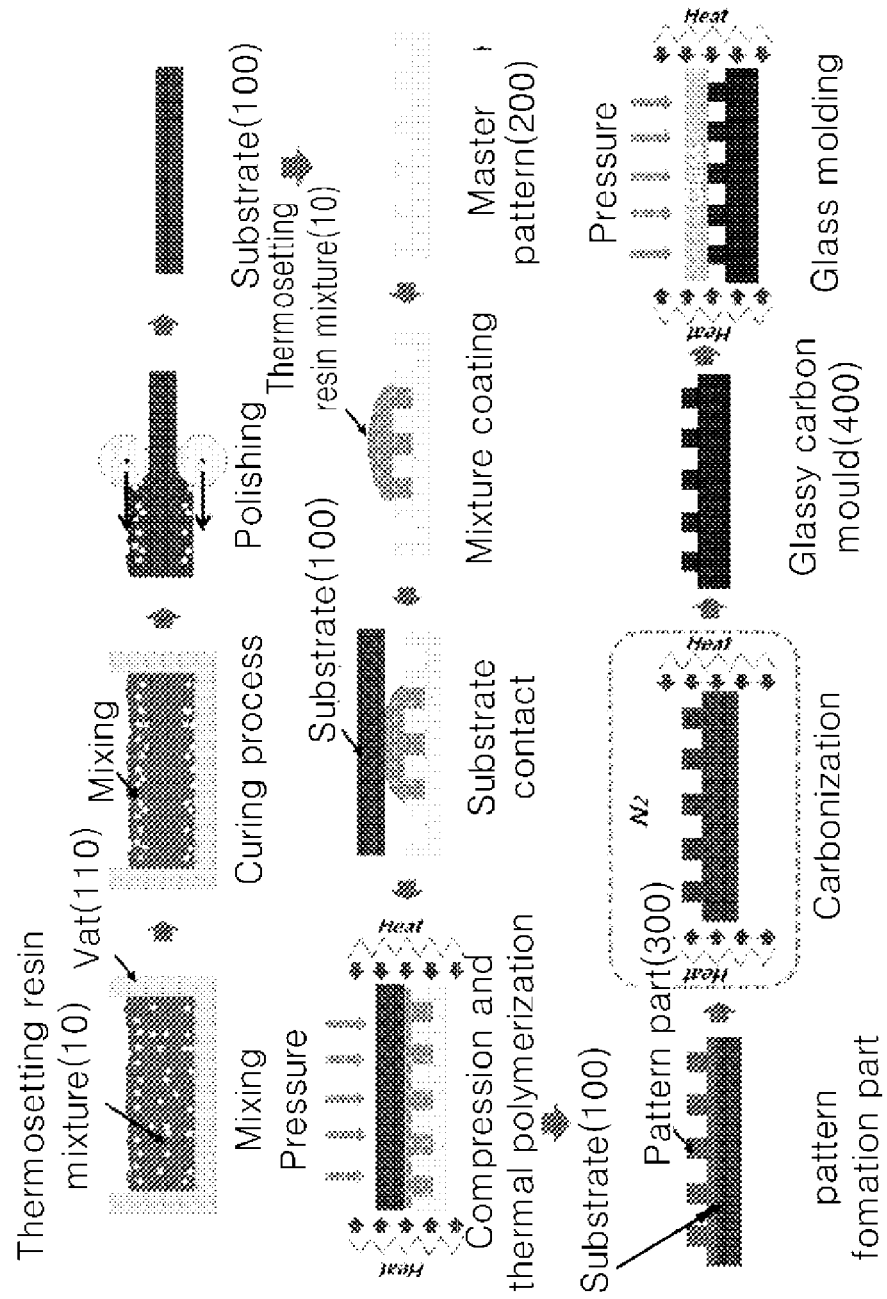
FIG. 1 is a schematic view illustrating a process for producing a glassy carbon mold in accordance with Example 1, and a glass molding press process using the same.

The present invention provides a method for producing a glassy carbon mold including disposing a mixture containing a thermosetting resin, a curing agent, and a viscosity-controlling solvent between a master pattern formed by a micro/nano process and a thermosetting resin substrate, pressing and heating the master pattern or the thermosetting resin substrate to form a cured thermosetting resin pattern portion on the substrate, and detaching the master pattern and carbonizing the substrate, and the cured thermosetting resin pattern portion present thereon.

Glassy carbon (vitreous carbon; VC) has a carbon structure obtained via thermal decomposition (i.e., pyrolysis) of a thermosetting resin, such as furan resin, phenolic resin, or polycarbodiimide resin as a precursor. Glassy carbon is a non-graphitizable carbon material, meaning, glassy carbon does not have the sufficient energy to enable the transition or atomic rearrangement to graphite, and is thus not anisotropic. Glass carbon is electrically, mechanically, and optically isotropic in spite of being thermally treated at a super-high temperature (e.g., 3,000° C.) and exhibits considerably excellent chemical resistance and superior mechanical properties. Glassy carbon is produced by polymerizing a thermosetting resin, followed by curing, and then carbonizing. The thermosetting resin is generally present as a liquid or solid at room temperature. At an early stage, the thermosetting resin decreases in viscosity and thus increases in fluidity as the temperature increases. Then, as temperature continues to increase, the thermosetting resin is converted into a B-stage resin and is then cured. The cured resin forms a three-dimensionally cross-linked network structure and becomes insoluble.

The polymerized thermosetting resin is converted into glassy carbon (aka vitreous carbon) by thermal decomposition during carbonization. The glassy carbon has superior shape stability at high temperatures and pressures and is thus applicable as a mold material for a glass molding press or for hot plastic working of metallic materials. When a predetermined pattern is formed using the thermosetting resin and then cured and carbonized, a mold having a micro- and/or nano-pattern can be produced at a lower cost and in an easier manner compared to conventional mold processing methods.

Accordingly, during the research of the method for producing a mold using glassy carbon as a material, the inventors of the present invention found that foams generated on the surface, and in an inner area of a heat-polymerized resin precursor in the process of blending and curing a highly viscous thermosetting resin, cause shape deformations of the glassy carbon mold and deterioration in the surface quality and internal uniformity during the process of carbonizing the resin. In addition, surface defects may be reduced via surface polishing, but the production of nano-pattern glassy carbon molds having superior surface quality is difficult due to the unsuitable application of polishing to nano-patterns.

In this regard, described herein is a method for producing a glassy carbon mold having superior surface quality, and includes forming a thermosetting resin pattern portion as a thin film on a previously prepared substrate by a replication process, then curing and carbonizing the thermosetting resin pattern portion in order to reduce defects (e.g., bending or foams) caused by the simultaneous formation of a pattern portion and a substrate portion of a glassy carbon mold. The substrate portion of the present invention is produced from a material having the same contraction characteristics during carbonization as that of the pattern portion, thereby obtaining a mold for a glass molding press that is free of cracks during the subsequent carbonization, and exhibits superior surface quality.

Hereinafter, the respective steps will be described in detail.

A step for disposing a mixture containing a thermosetting resin, a curing agent, and a viscosity-controlling solvent between a master pattern formed by a micro- and/or nano-process and a thermosetting resin substrate, is performed in order to manufacture a glassy carbon mold.

In one embodiment of the present invention, the thermosetting resin substrate may be produced by applying a mixture containing a thermosetting resin, a curing agent, and a viscosity-controlling solvent, followed by curing and polishing.

In another embodiment of the present invention, the curing of the thermosetting resin substrate may include a primary curing performed under a vacuum atmosphere at 10 to 30° C., and secondary curing performed while increasing the temperature to 70 to 200° C.

In one embodiment of the present invention, any thermosetting resin may be used without limitation so long as it enables the production of glassy carbon by polymerizing, curing, and carbonizing processes. More specifically, the thermosetting resin may be selected from the group consisting of furan, phenol, and poly(carbodiimide) resins. The thermosetting resin of the substrate may be the same as that of the pattern portion. More specifically, the thermosetting resin may be a furan resin, or even more specifically, furfuryl alcohol, but embodiments of the present invention are not limited thereto.

The curing agent may include an acid catalyst such as p-toluenesulfonic acid monohydrate ($CH_3C_6H_4SO_3H.H_2O$, PTSA), $ZnCl_2$, or citric acid. In another embodiment, the curing agent may include a basic catalyst such as sodium hydroxide, potassium hydroxide, ammonia, and amines. The curing agent may be present in an amount of 0.1 parts by weight to 0.6 parts by weight, with respect to 100 parts by weight of the thermosetting resin. When the curing agent is present in an amount of less than 0.1 parts by weight with respect to 100 parts by weight of the thermosetting resin, the economic efficiency is poor due low curing rates, and when the curing agent is present in an amount exceeding 0.6 parts by weight, control of the curing rate is difficult.

The viscosity-controlling solvent may include, for example, alcohol, such as methanol and ethanol, a ketone, such as acetone, or an aromatic solvent, such as toluene. When the viscosity-controlling solvent is not used, inner foams do not completely expand and escape during the curing due to the excessively high initial viscosity of the mixture, and the molding precursor is disadvantageously cured while excessive fine foams remain on the back surface of the molding precursor. The viscosity-controlling solvent may be added to easily remove foams generated during the primary and secondary curing processes. In particular, when the viscosity-controlling solvent is not added upon application of the vacuum conditions for the curing process, the molding precursor is disadvantageously cured while excessive fine foams remain on the back surface of the molding precursor.

The primary curing process may be performed under vacuum at room temperature, for example, 10 to 30° C., or 20 to 30° C., and the curing may be performed for 1 to 10 days, 3 to 7 days, or 4 to 6 days.

After the primary curing, the secondary curing may be performed by increasing curing temperature to about 70° C. to about 200° C. at a predetermined rate. In this case, the increase of the curing temperature at the predetermined rate aims at minimizing an increase in the polymerization rate, an increase in the internal stress and blocking of gas discharge passage, caused by rapid increase in temperature. For example, heating is performed at a rate of about 0.1° C./min to about 100° C. during the secondary curing process. In this case, the secondary curing process may be performed while maintaining the temperature for about 60 minutes for every temperature increase of about 5° C.

Polishing is performed to remove surface defects caused by foams or the like that remain un-discharged even after the curing. Through such a detachment process of the surface layer, a thermosetting resin substrate having high surface quality is produced.

After the production of the substrate by the method described above, the mixture containing a thermosetting resin, a curing agent, and a viscosity-controlling solvent is disposed between the master pattern formed by a micro- and/or nano-process and the thermosetting resin substrate, and the master pattern or the thermosetting resin substrate is then pressed and heated to form a cured thermosetting resin pattern portion on the substrate.

In one embodiment of the present invention, the master pattern is formed by a micro-nano process and may be a pattern having a variety of line widths and cycles, for example, a line grating, a rectangular or hexagonal dot pattern, a chess pattern, a depressed lens pattern, a depressed lenticular lens pattern, a depressed Fresnel lens pattern, or a depressed micro-channel pattern.

The micro-nano process for production of the master pattern may be a semiconductor process, a MEMS/NEMS process, mechanical working, nano-imprinting or electro-forming, without limitation. For convenience of the process, a master pattern composed of a polymer material, such as polydimethylsiloxane (PDMS), easily separated later due to elasticity, is produced by a casting process using the polymer material on the substrate having a micro/nano pattern.

The mixture containing a thermosetting resin, a curing agent, and a viscosity-controlling solvent is disposed between the master pattern and the substrate, and the master pattern or the thermosetting resin substrate is pressed and then heated to form a cured thermosetting resin pattern portion on the substrate.

The thermosetting resin, the curing agent, and the viscosity-controlling solvent are the same as those used for the formation of the substrate, therefore, a detailed explanation thereof is omitted.

In one embodiment of the present invention, the curing of the thermosetting resin pattern portion may be performed by heating at 60 to 150° C. for 30 minutes to 3 hours. In another embodiment of the present invention, after the curing, curing may be further performed by increasing the temperature to 70 to 200° C. In this case, increase of the curing temperature at a predetermined rate aims at minimizing increases in polymerization rate, increases in the internal stress and blocking of a gas discharge passage, caused by rapid increases in temperature. For example, heating is performed at a rate of about 0.1° C./min to about 100° C. during the secondary curing. In this case, curing may be further performed while maintaining the temperature for about 60 minutes for every temperature increase of about 5° C.

When the thermosetting resin pattern portion is cured, the thermosetting resin pattern portion is disposed on the substrate, the master pattern is removed, and the remaining structure is then carbonized.

Glassy carbon discharges a gas component, such as carbon monoxide (CO), carbon dioxide ($CO_2$) or water ($H_2O$) during the curing and carbonizing processes, and thus is thermally contracted. The glassy carbon may crack when excessive gas components are simultaneously discharged due to rapid reaction. For this reason, the carbonization process and/or the conditions thereof for controlling this phenomenon should be introduced. Accordingly, the temperature increase rate is kept low enough for the carbonization temperature to allow the amount of gas generated during the carbonization process to sufficiently escape from the glassy carbon mold. For example, the carbonization temperature is maintained in a furnace from room temperature to 600° C. for about 60 minutes for every temperature increase of about 60° C. at a temperature increase rate of about 1° C./min, and is maintained for about 60 minutes after the temperature reaches 1,000° C. In order to prevent oxidation of the glassy carbon mold during carbonization, the carbonization is performed under an inert atmosphere via passing inert gas, such as nitrogen ($N_2$), into the furnace at a rate of 500 cc/min.

In accordance with the present invention, the material for the pattern portion, and the material for the substrate portion, have the same contraction characteristics, thus preventing cracks caused by the subsequent carbonization process. Also, the material for the pattern portion and the material for the substrate portion may be the same thermosetting resin.

In addition, the present invention provides a method for forming a fine glass pattern including disposing the glassy carbon mold produced by the method described above on a glass substrate, thermally treating the glassy carbon mold and the glass substrate at a glass transition temperature or higher of the glass substrate, pressing the thermally-treated glassy carbon mold and glass substrate to transfer the pattern of the glassy carbon mold to the glass substrate, cooling the glass substrate having the pattern transferred from the glassy carbon mold, and detaching the glass substrate from the glassy carbon mold, and the glass substrate having the fine pattern formed by the method.

A pressure of about 300 kgf/m$^2$ to about 600 kgf/m$^2$ is applied to the thermally-treated glassy carbon mold and glass substrate that contact each other to transfer a pattern of the glassy carbon mold to the glass substrate. When the pressure is less than about 300 kgf/m$^2$, the pattern may be not transferred to the glass substrate, and when the pressure exceeds 600 kgf/m$^2$, excessive pressure may be applied to the glassy carbon mold, thus causing damage to the predetermined micro- and/or nano-pattern. This makes it difficult to form a repeatedly desired micro- and/or nano-pattern on the glass substrate.

After cooling, the glass substrate having the pattern transferred from the glassy carbon mold is detached from the glassy carbon mold to obtain a glass substrate having the pattern transferred from the glassy carbon mold. That is, a fine pattern, such as micro- and/or nano-pattern, can be easily formed on the glass substrate.

The shape of the fine pattern of the glassy carbon mold may be a depressed form of a Fresnel primary optical system for concentrating solar cells, a depressed form of a nano-pattern having at least one of anti-reflection, anti-fingerprint, and self-cleaning properties, or a depressed form of a microfluidic channel, without limitation.

Through the glassy carbon mold having the pattern, it is possible to obtain a Fresnel primary optical system glass substrate for concentrating solar cells, a functional glass substrate having at least one of anti-reflection, anti-fingerprint, and self-cleaning properties, or a microfluidic channel glass substrate.

In addition, the glassy carbon mold of the present invention has superior shape stability at high temperatures and pressures, and is thus applicable to hot plastic working of metallic materials. Accordingly, the present invention provides a method for forming a fine metal pattern including disposing the glassy carbon mold produced by the method described above on a metal substrate, thermally treating the glassy carbon mold and the metal substrate at a decrystallization temperature or higher of the metal, pressing the thermally-treated glassy carbon mold and the thermally-treated metal substrate to transfer a pattern of the glassy carbon mold to the metal substrate, cooling the metal substrate having the pattern transferred from the glassy carbon mold and detaching the metal substrate from the glassy carbon mold, and a metal substrate having the fine metal pattern formed by the method.

Hereinafter, the present invention will be described in detail with reference to examples for a better understanding of the present invention. The following examples are provided only for illustration of the present invention and should not be construed as limiting the scope and spirit of the present invention. The examples are provided so that the present invention will be thorough and complete, and will fully convey the scope of the invention to those skilled in the art.

<Example 1> Production of a Glassy Carbon Mold

FIG. 1 is a schematic view illustrating a process for producing a mold according to the present invention. Hereinafter, a production example of a glassy carbon mold according to the present invention will be described based on FIG. 1.

1. Production of Thermosetting Resin Substrate 100

A mixture 10 containing 100 parts by weight of a furan resin, 0.2 parts by weight of p-toluenesulfonic acid monohydrate ($CH_3C_6H_4SO_3H.H_2O$, PTSA) as a curing agent, and 10 parts by weight of ethanol, with respect to 100 parts by weight of the furan resin, was mixed by stirring for about 30 minutes, then applied to a vat 110 including a substrate, and the vat 110 was then primarily cured at room temperature under a vacuum atmosphere for about 5 days. Then, the vat 110 was secondarily cured by heating at a rate of about 0.1° C./min up to about 100° C. and maintaining the temperature for about 60 minutes for every temperature increase of about 5° C.

Most foams present in the thermosetting resin mixture can be removed through such a curing process, but removal of foams present around the vat 110 and on the top of the mixture is often relatively incomplete. Polishing was performed in order to remove a layer containing large amounts of foams disposed on the top and bottom of the substrate and to produce a substrate with a uniform thickness applicable to the glass molding press. A thermosetting resin substrate 100 having a high-quality surface and a uniform thickness was produced by detaching the surface layer.

2. Production of a Master Pattern 200 by a Micro and/or Nano Process

The master pattern that is formed with a slightly large size compared to the shape of a glass micro/nano pattern product, finally obtained by a glass molding press process in consideration of contraction during a production process, may be obtained by a variety of micro/nano processing techniques. The master pattern 200 is for example produced by reactive ion etching (RIE) using a barrier produced by photolithography of a silicon substrate.

The silicon substrate may be readily damaged due to high brittleness during a series of thermosetting resin replication processes. Accordingly, an elastomer or polymer substrate having a micro/nano pattern, obtained by transferring the micro/nano-pattern on the silicon substrate produced by etching through a replication process using an elastomer or polymer such as PDMS, may be used as the master pattern 200.

In another example of producing the master pattern, a metal master pattern 200 may be produced by electroforming a micro/nano resist pattern, produced by lithography of a silicon substrate, and an elastomer or polymer master pattern 200 obtained by replicating the resist pattern may be produced.

In addition, direct working of a metal, polymer, or ceramic material may be also used for the production of the master pattern 200, and a variety of methods including direct working, lithography, etching, thermal treatment (e.g., reflowing), electroforming, elastomer and polymer replication, and combinations thereof may be applied to the production of the master pattern 200.

In an embodiment of the present invention, a silicon wafer is subjected to photolithography using a contact aligner and is etched to produce a silicon pattern, the silicon pattern is replicated using PDMS and a UV curable polymer to produce a master pattern having a micro pattern, A master pattern having a nano-pattern is produced by KrF laser scanning lithography, etching, and replication of PDMS and UV curable polymer.

3. Formation of a Cured Thermosetting Resin Pattern Portion 300 on a Substrate

A mixture 10 prepared by homogeneously stirring 100 parts by weight of a furan resin, 0.2 parts by weight of p-toluenesulfonic acid monohydrate ($CH_3C_6H_4SO_3H.H_2O$, PTSA) as a curing agent, and 10 parts by weight of ethanol with respect to 100 parts by weight of the furan resin for about 30 minutes was disposed between a master pattern and a substrate 100, and the substrate 100 was pressed and then cured.

More specifically, the primary curing was performed by elevating the temperature to 60 to 150° C. on a hot plate for about 90 minutes. Then, the secondary curing was performed by heating to about 100° C. at a rate of about 0.1° C./min and maintaining the temperature for about 60 minutes for every temperature increase of about 5° C.

After the curing, a cured thermosetting resin pattern portion 300 was formed on the substrate and the master pattern 200 was then detached from the glassy carbon mold 400.

4. Carbonization

Carbonization was performed in a furnace by maintaining a carbonization temperature from room temperature to 600° C. for about 60 minutes for every temperature increase of about 60° C. at a temperature increase rate of about 1° C./min, and maintaining the temperature for about 60 minutes after the temperature reached 1,000° C. In order to prevent oxidation of the glassy carbon mold 400 during carbonization, the carbonization was performed under an inert atmosphere by passing inert gas, such as nitrogen ($N_2$), into the furnace at a rate of 500 cc/min.

<Example 2> Formation of a Glass Fine Pattern

A glass substrate was disposed on the glassy carbon mold 400, produced by the production method of Example 1, and was then heated to a glass transition temperature or higher of the glass. Nitrogen ($N_2$) was passed at a rate of 300 cc/min to 1,000 cc/min in order to prevent oxidation of the materials and the mold.

Then, the pattern of the glassy carbon mold 400 was transferred to the glass substrate by applying a pressure of about 300 kgf/$m^2$ to 600 kgf/$m^2$ thereto. After cooling, the glass substrate having the pattern transferred from the glassy carbon mold 400 was detached from the glassy carbon mold 400 to obtain a glass substrate having a pattern transferred from the glassy carbon mold.

Figure 2:
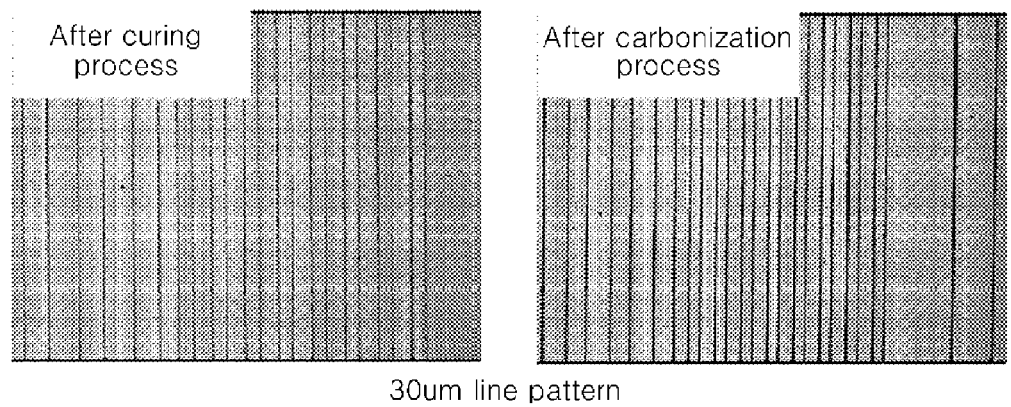
FIG. 2 is a microscopic image illustrating a surface of a cured thermosetting resin pattern portion produced in accordance with Example 1, and a surface of the glassy carbon mold after carbonization.
Figure 2:
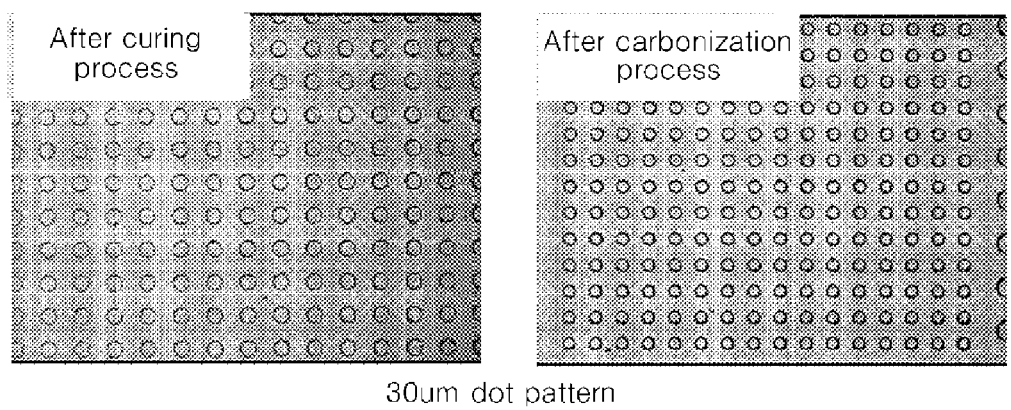

<Experimental Example 1> Evaluation of the Surface Properties of a Glassy Carbon Mold FIG. 2 is a microscopic image illustrating a surface of a cured thermosetting resin pattern portion produced in accordance with Example 1, and a surface of a glassy carbon mold after carbonization.

According to the present invention, it can be seen that a glassy carbon mold with superior surface quality, without the generation of foams on the surface, was produced and in particular, even after carbonization, the glassy carbon mold was free of cracks caused by non-uniform contractions.

When the glassy carbon mold with superior surface quality for a glass molding press is used, the glassy carbon mold can be thus continuously used for the fine-pattern forming process using a glass molding press process, and enables the production of fine patterns with high precision due to the high durability of the glassy carbon mold, as compared to a glassy carbon mold having a great number of pores.

<Comparative Example 1> Production of the Integral Form of a Glassy Carbon Mold

Figure 3:
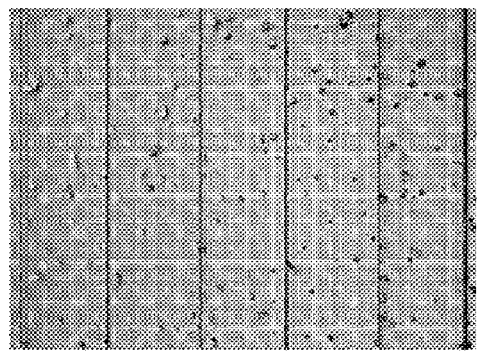
FIG. 3 is a microscopic image showing an integrated form of glassy carbon mold in accordance with Comparative Example 1.
Figure 3:
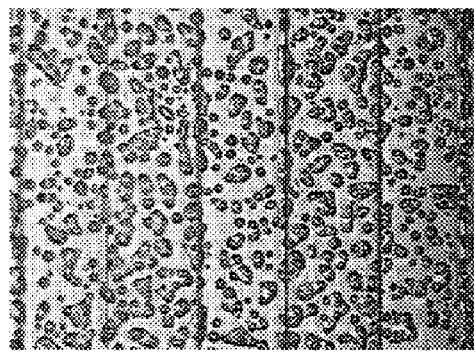
Figure 3:
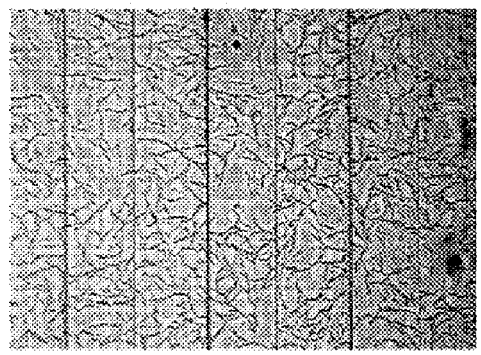
Figure 3:
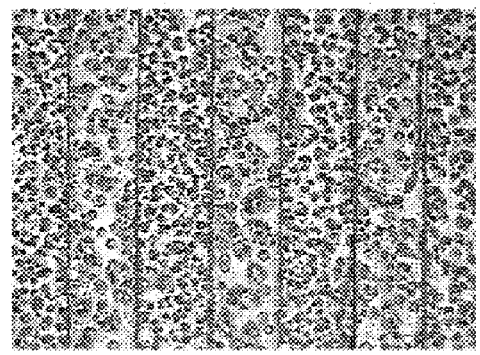

FIG. 3 is a microscopic image showing a cured heat-polymerized resin pattern having a line width of 150 μm produced using a thermosetting resin containing 0.3 wt % (left) of a curing agent or 0.6 wt % (right) of a curing agent, and a glassy carbon mold produced by carbonizing the heat-polymerized resin pattern. The heat-polymerized resin molding product has a thickness of 1 to 10 mm and has an integrated form, unlike the present invention wherein the substrate is separately produced.

In Comparative Example 1, fine pores remaining on the surface based on the curing agent could be controlled, as shown in FIG. 3, but complete removal of the fine pores for formation of a heat-polymerized resin structure with increased thickness was difficult.

Foams produced during the blending of the thermosetting resin are the biggest factor in deteriorating the surface quality of the glassy carbon mold, and in particular, in cases wherein a heat-polymerized resin structure with increased thickness is formed, like in conventional methods, a relatively large amount of pores are produced on the pattern surface and remain as defects on the glassy carbon mold surface. Accordingly, as in the present invention, a heat-polymerized resin precursor having a micro/nano pattern with high surface-quality was produced by separately forming a substrate portion and a pattern portion in the formation of the heat-polymerized resin precursor for producing a glassy carbon mold, and the surface properties thereof are shown in FIG. 2.

Figure 4:
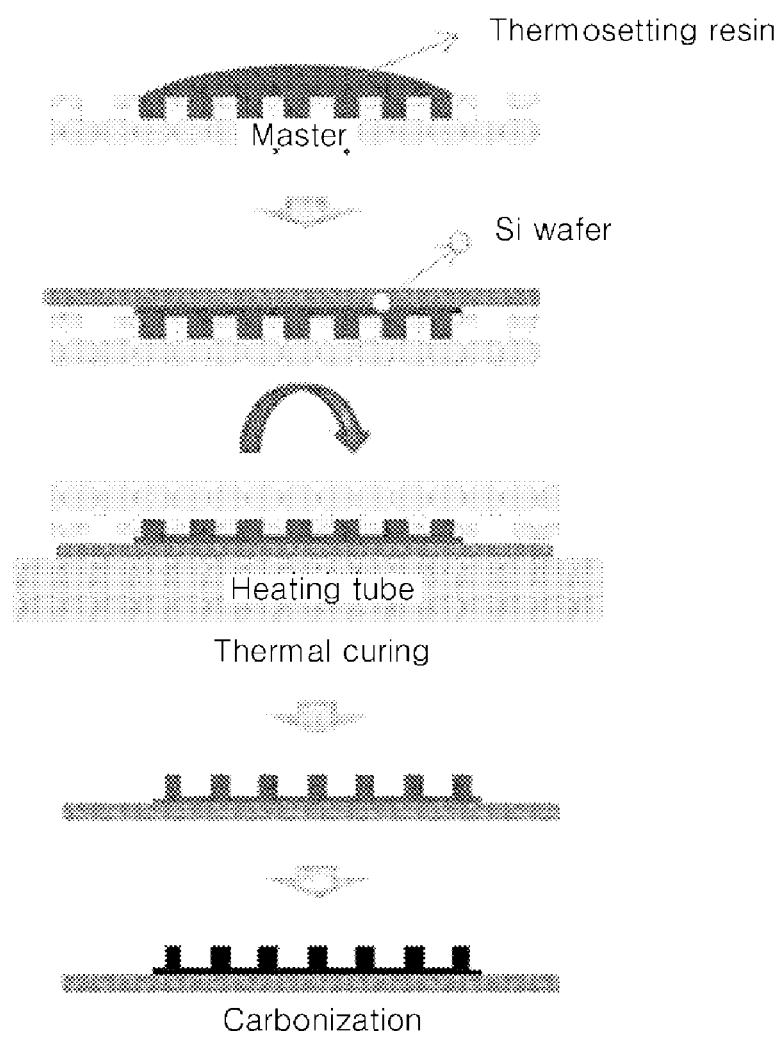
FIG. 4 is a view briefly illustrating a process in accordance with Comparative Example 2, wherein a silicon wafer is used as a substrate portion, a thermosetting resin pattern portion is formed on the substrate, and carbonization is then performed.

<Comparative Example 2> Production of a Glassy Carbon Mold Using a Substrate Composed of Different Materials FIG. 4 is a view briefly illustrating a process wherein a silicon wafer is used as a substrate portion, a thermosetting resin pattern portion is formed on the substrate, and carbonization is then performed. Because the heat-polymerized resin generated during carbonization has a high contraction of about 20%, when the substrate portion and the pattern portion are composed of different materials, deformations and cracks may be generated due to differences in contraction.

Figure 5:
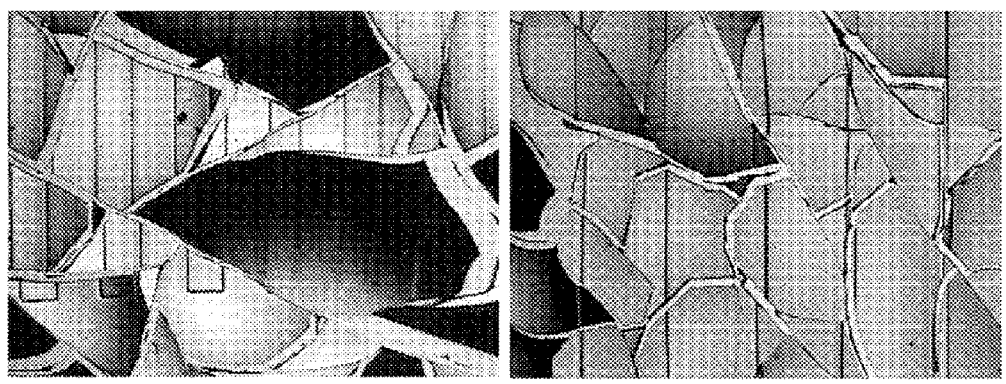
FIG. 5 is a microscopic image illustrating a glassy carbon mold in accordance with Comparative Example 2.

As can be seen from FIG. 5, in the case of Comparative Example 2 in which the silicon wafer is used as the substrate, cracks are generated. Accordingly, the substrate portion and the pattern portion are composed of the same material, and the substrate portion and the pattern portion should be composed of materials having similar contraction during the carbonization although they are composed of different materials.

Although certain configurations of the present invention have been disclosed in detail, those skilled in the art will appreciate that the detailed disclosure is provided only for exemplary embodiments and should not be construed as limiting the scope and spirit of the present invention.

Accordingly, the substantial scope of the present invention will be defined by the appended claims and their equivalents.

The invention claimed is:

1. A method for producing a glassy carbon mold, the method comprising: preparing a substrate formed of thermosetting resin, the preparing of the substrate comprises: curing a mixture comprising a thermosetting resin, a curing agent and a viscosity-controlling solvent, and polishing the cured mixture to prepare the substrate; preparing a master pattern having a micro/nano structure; disposing a mixture comprising a thermosetting resin, a curing agent and a viscosity-controlling solvent on the master pattern and then disposing the substrate on the mixture; pressing the substrate toward the master pattern and curing the mixture to form a pattern portion formed of thermosetting resin on the substrate; detaching the master pattern; and carbonizing the substrate and the pattern portion to produce the glassy carbon mold, wherein the thermosetting resin of the substrate and the thermosetting resin of the pattern portion are formed of the same material of the thermosetting resin, the thermosetting resin is either furan resin or furfuryl alcohol, and the mixture for preparing the substrate is the same as the mixture for preparing the pattern portion.

2. The method according to claim 1, wherein the thermosetting resin of the substrate undergoes the same contraction during the carbonization as the thermosetting resin of the pattern portion.

3. The method according to claim 1, wherein the thermosetting resin of the pattern portion is selected from the group consisting of a furan resin, a phenol resin, and a polycarbodiimide resin.

4. The method according to claim 1, wherein the curing of the mixture is carried out by heating at 60 to 150° C. for 30 minutes to 3 hours.

5. The method according to claim 4, wherein the curing of the mixture further comprises another curing performed by heating at 70 to 200° C.

6. A method for forming a fine glass pattern comprising:
disposing the glassy carbon mold produced by the method according to claim 1 on a glass substrate;
thermally treating the glassy carbon mold and the glass substrate at a glass transition temperature or higher of the glass substrate;
pressing the thermally treated glassy carbon mold and the thermally treated glass substrate to transfer a pattern of the glassy carbon mold to the glass substrate;
cooling the glass substrate having the pattern transferred from the glassy carbon mold; and
detaching the glass substrate from the glassy carbon mold.

7. A method for forming a fine metal pattern comprising:
disposing the glassy carbon mold produced by the method according to claim 1 on a metal substrate;
thermally treating the glassy carbon mold and the metal substrate at a decrystallization temperature or higher of the metal;
pressing the thermally treated glassy carbon mold and metal substrate to transfer a pattern of the glassy carbon mold to the metal substrate;
cooling the metal substrate having the pattern transferred from the glassy carbon mold; and
detaching the metal substrate from the glassy carbon mold.

8. The method according to claim 1, wherein the thermosetting resin is furan resin.

9. The method according to claim 1, wherein the thermosetting resin is furfuryl alcohol.

10. The method according to claim 1, wherein the curing agent comprises p-toluenesulfonic acid monohydrate, or citric acid.

11. The method according to claim 1, wherein the curing agent comprises sodium hydroxide, potassium hydroxide, ammonia, or amines.

12. The method according to claim 1, wherein the curing agent is present in an amount of 0.1 parts by weight to 0.6 parts by weight, with respect to 100 parts by weight of the mixture.

13. The method according to claim 1, wherein the viscosity-controlling solvent comprises alcohol, a ketone, or an aromatic solvent.

14. The method according to claim 1, wherein the master pattern is formed by a nano process and has a pattern having at least one of a line grating, a rectangular or hexagonal dot pattern, a chess pattern, a depressed lens pattern, a depressed lenticular lens pattern, a depressed Fresnel lens pattern, and a depressed micro-channel pattern.

* * * * *